(12) United States Patent  
Lin

(10) Patent No.: US 6,602,954 B1  
(45) Date of Patent: Aug. 5, 2003

(54) TIRE COMPONENTS CONTAINING FUNCTIONALIZED POLYOLEFINS

(75) Inventor: Chen-Chy Lin, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/643,339

(22) Filed: Aug. 22, 2000

Related U.S. Application Data

(63) Continuation of application No. 09/209,271, filed on Dec. 11, 1998, which is a continuation-in-part of application No. 09/001,985, filed on Dec. 31, 1997, now abandoned.

(51) Int. Cl.$^7$ .................. C08G 63/48; C08G 63/91; C08L 39/04; C08L 51/00; C08F 8/00
(52) U.S. Cl. .................. 525/70; 152/565; 525/73; 525/74; 525/78; 525/326.1; 525/326.8; 525/327.2; 525/327.3; 525/327.4
(58) Field of Search ............... 525/73, 74, 78, 525/70, 326.1, 326.8, 327.2, 327.3, 327.4; 152/565

(56) References Cited

U.S. PATENT DOCUMENTS

| | | | |
|---|---|---|---|
| 4,299,931 A | 11/1981 | Coran et al. | 525/95 |
| 4,675,349 A | 6/1987 | Palombo et al. | 523/351 |
| 4,792,583 A | 12/1988 | Coran | 524/504 |
| 4,883,837 A | 11/1989 | Zabrocki | 525/66 |
| 5,238,997 A | 8/1993 | Bauer et al. | 525/66 |
| 5,292,590 A | 3/1994 | Lin et al. | 428/494 |
| 5,341,863 A | 8/1994 | Sandstrom et al. | 152/209 |
| 5,621,044 A | 4/1997 | Wang | 525/193 |

FOREIGN PATENT DOCUMENTS

| | | |
|---|---|---|
| EP | 0 810 237 A1 | 12/1997 |
| EP | 0 855 425 A1 | 1/1998 |
| WO | 95/02011 | 1/1995 |

OTHER PUBLICATIONS

"Improved Durability in OTR Mining Tires" by Walker et al., Katschuk–Gummi, Kunslatolle 38, Johrgang, Nr, Jun., 1985.

"Improving Cutting, Chipping Resistance of Tire Treads" by Engelhardt et al., ITEC '96 Select, pp. 12–19, 1996.

"The Anhydride content of Some Commercial PP–g–MA: FTIR and Titration"by Sclavons, Journal of Applied Polymer Science, vol. 62, pp. 1205–1210, 1996.

"Blends of Elastomers and Thermoplastics—A Review" by J.R. Dunn, Rubber Chemical Technology, vol. 49, pp. 978–991, 1976.

"Modification of Rubbers with Solid Polymers" by Zelenev et al., Sov. Rubber Tech. vol. 29, pp. 21–23, 1970.

"Associations Éolastomères–Plastomères Étude de Quelques Properiétés" by Blondel, Rev. Gen Caoutch Plast., vol. 44, No. 9, pp. 1011–1017, 1967.

"Properties of Tread Vulcanizates Containing Polyethylene and Copolymers of Ethylene with Other Monomers" by Tyurina et al., Sov. Rubber Tech., vol. 30, pp. 15–16, 1971.

"Features of the Change in the Properties of Rubber Mixes and Vulcanizates on the Addition of Plastics" by Tyurina et al., Sov. Rubber Tech. vol. 31, pp. 14–17, 1972.

"Properties of Carcass Vulcanizates for Radial–Ply Tyres" by Priklonskaya et al., Sov. Rubber Tech., vol. 28, pp. 11–13, 1969.

"OREVAC® Coextrusion Adhesives", Elf Atochem North America, Inc., Technical Brochure, Mar., 1997.

"Modification of Polyolefins with Maleic Anhydride" by André H. Hogt, COMPALLOY '90, pp. 181–193, 1990.

"The Maleic Anhydride Grafting of Polypropylene with Organic Peroxides" by Callais, COMPALLOY '90, pp. 359–369.

EXXELOR, Exxelor PO 1015, Exxon Chemical, Technical Brochure, undated.

*Primary Examiner*—Patrick D. Niland
(74) *Attorney, Agent, or Firm*—Meredith E. Palmer; Arthur M. Reginelli

(57) ABSTRACT

A tire having improved tear strength including at least one component comprising: a vulcanized elastomer; and up to about 35 parts by weight functionalized polyolefin per one hundred parts by weight rubber.

14 Claims, No Drawings

TIRE COMPONENTS CONTAINING FUNCTIONALIZED POLYOLEFINS

This application is a continuation of U.S. Ser. No. 09/209,271, filed on Dec. 11, 1998, which is a continuation-in-part of co-pending U.S. Ser. No. 09/001,985, filed on Dec. 31, 1997, now abandoned.

TECHNICAL FIELD

This invention is directed toward rubber vulcanizates having improved tear strength. More particularly, the present invention is directed toward tires and tire components that are produced from vulcanizable compositions of matter that contain polyolefins. The polyefins are functionalized and have been found to increase the tear strength of vulcanizates without deleteriously impacting the mechanical properties of the vulcanizates.

BACKGROUND OF THE INVENTION

Off road or heavy truck tires are often subjected to rough road conditions that produce repetitive, localized high pressure pounding on the tire. These stresses can cause fatigue fracture and can lead to crack formation and growth. This degradation of the tire has also been referred to as chipping or chunking of the tread surface or base material.

In an attempt to prevent this degradation, it is known to add reinforcements such as carbon black, silicas, silica/silanes or short fibers to tire compositions. Silica has been found advantageous because of its ability to deflect and suppress cut prolongation, and silanes have been added to bind the silica to unsaturated elastomers. The fibers that have been added include nylon and aramid fibers.

It is also known that the addition of polyolefins to rubber compositions can provide several beneficial properties. For example, low molecular weight, high density polyethylene, and high molecular weight, low density polyethylene, are known to improve the tear strength of polybutadiene or natural rubber vulcanizates. In the tire art, It has also been found that polyethylene increases the green, tear strength of carcass compounds and permits easy extrusion in calendering without scorch. Polypropylene likewise increases the green strength of butyl rubber. Polypropylene, has also been effective in raising the static and dynamic modulus of rubber, as well as the tear strength of the rubber.

Although the addition of polyolefins to rubber compositions is known to provide several beneficial effects, the addition of polyolefin to tire recipes has, heretofore, had a deleterious affect on the mechanical, wear, and hysteresis properties of tires, as well as handling and ride comfortability of tires.

Accordingly, there remains a need in the art to improve the tear strength of rubber vulcanizates, especially those deriving from tire compositions, without sacrificing the other properties of vulcanizates, tire components or tires.

SUMMARY OF INVENTION

It is therefore an object of the present invention to provide a tire component having increased tear strength, where the tire component is less susceptible to chipping and chunking, without substantially impacting the mechanical and wear properties of the tire component.

It is another object of the present invention to provide a tire component having increased tear strength, where the tire component is less susceptible to chipping or chunking, without substantially impacting the hysteresis properties of the tire component.

It is yet another object of the present invention to provide a vulcanizate having increased tear strength, where the vulcanizate is less susceptible to chipping and chunking, without substantially impacting the mechanical and wear properties of the vulcanizate.

It is still another object of the present invention to provide a vulcanizate having increased tear strength, where the vulcanizate is less susceptible to chipping or chunking, without substantially impacting the hysteresis properties of the vulcanizate.

It is also an object of the present invention to provide vulcanizable compositions of matter that will give rise to a cured product having increased tear strength, where the cured product is less susceptible to chipping and chunking, without substantially impacting the mechanical and wear properties of the cured product.

It is another object of the present invention to provide vulcanizable compositions of matter that will give rise to a cured product having increased tear strength, where the cured product is less susceptible to chipping or chunking, without substantially effecting the hysteresis properties of the cured product.

It is yet another object of the present invention to provide a tire having increased tear strength without substantially impacting the mechanical and wear properties of the tire at high temperatures.

It is still yet another object of the present invention to provide a vulcanizate having increased tear strength without substantially impacting the mechanical and wear properties of the vulcanizate after heat aging.

At least one or more of the foregoing objects, together with the advantages thereof over the known art relating to tire components and compositions for making the same, which shall become apparent from the specification that follows, are accomplished by the invention as hereinafter described and claimed.

In general the present invention provides a tire having improved tear strength including at least one component comprising: a vulcanized elastomer; and up to about 35 parts by weight functionalized polyolefin per one hundred parts by weight rubber.

The present invention also provides a vulcanizable composition of matter comprising: an elastomer; up to about 35 parts by weight functionalized polyolefin per one hundred parts rubber; and up to about one hundred parts by weight of a reinforcing filler per one hundred parts by weight rubber.

The present invention further provides a vulcanizate prepared by a process comprising the steps of: preparing a vulcanizable composition of matter that includes an elastomer and a functionalized polyolefin; and vulcanizing the composition of matter with at least one vulcanizing agent.

PREFERRED EMBODIMENT FOR CARRYING OUT THE INVENTION

It has now been found that the addition of functionalized polyolefin to vulcanizable compositions of matter that are useful for making tires provides for tires and tire components having increased tear strength without substantially affecting the mechanical, wear, and hysteresis properties of the tire rubber. Notably, the mechanical properties of the tire components are not substantially degraded after heat aging by the addition of the functionalized polyolefin. Accordingly, the present invention contemplates vulcanizable compositions of matter, tire recipes, vulcanizates, tire components and tires containing functionalized polyolefin.

The practice of the present invention is especially useful in base stock recipes, but inasmuch as the increase in tear strength does not deleteriously impact the wear, mechanical, and hysteresis properties of the rubber, the practice of the present invention may also be applied to the tread and sidewall stocks of tires. Furthermore, it should be understood that the practice of the present invention is believed to be especially advantageous for off-road or heavy-duty truck tires, although it is believed that the practice of the present invention will improve other tires such as passenger tires.

The functionalized polyolefins that are useful in this invention include functionalized polypropylene and functionalized propylene-ethylene copolymers. The propylene-ethylene copolymers may simply be referred to as copolymers. In general, the functionalized polyolefins include those polyolefins that contain at least one moiety as a functional group. These moieties can include, for example, those that derive from maleic anhydride, acrylic acid, and epoxides. Maleic anhydride functionalized polyolefins are most preferred.

Generally, the polyolefins should contain from about 0.05 to about 3 percent by weight of the functionalized moiety. More preferably, the polyolefins should contain from about 0.1 to about 2 percent by weight of the functionalized moeity, and even more preferably from about 0.15 to about 0.5 percent by weight of the functionalized moiety.

The functionalized polyolefins that are useful in practicing this invention are, for the most part, commercially available. These commercially available functionalized polyolefins can be prepared by a number of techniques. For example, maleic anhydride can be grafted to a polypropylene homopolymer or copolymer in the presence of organic peroxide either in the melt, solid state, or in solution. The most common method employed is the melt or solid-state processes. These processes may also be referred to as reactive extrusion. For further information on the functionalization of polypropylene or propylene-ethylene copolymers with maleic anhydride by using reactive extrusion techniques, one can refer to *Reactive Extrusion Principals and Practice, Reactive Extrusion: A Survey of Chemical Reactions of Monomers and Polymers During Extrusion Processing*, pp.75–198, by Xanthos (1992 Hanser Publishers), and *Molecular Characterization of Maleic Anhydride—Functionalized Polypropylene, Journal of Polymer Science*, pp. 829–842, by Roover, et. al. (1995 John Wiley & Sons, Inc.), both of which are incorporated herein by reference.

The molecular weight of the polyolefin polymers and copolymers used in this invention can vary. Indeed, the molecular weights of commercially available polymers and copolymers vary. It is, however, preferred that the molecular weight of the polyethylene polymers and copolymers employed be from about 100,000 to about 500,000, preferably from about 150,000 to about 400,000, and even more preferably from about 175,000 to about 400,000, as determined by using standard GPC analysis with polystyrene as the standard. Generally, the molecular weight distribution (Mw/Mn) should be less than about 4.5, preferably less than about 4.0, and even more preferably less than about 3.8.

With respect to the polymeric backbone of the functionalized polypropylene, most polypropylene homopolymers that are commercially produced have an isotatic microstructure. The propylene-ethylene copolymers can be a random or block copolymers. Preferably, the copolymers will contain some polyethylene crystals. The copolymers should include a major amount of polypropylene or propylene units and only a minor amount of polyethylene or ethylene units. Specifically, the copolymers should contain less than about 40 percent by weight polyethylene or ethylene units. Preferably, the copolymers should contain from about 1 to about 30 percent by weight polyethylene or ethylene units, more preferably from about 1.5 to about 25 percent by weight polyethylene or ethylene units, and even more preferably from about 2 to about 23 percent by weight polyethylene or ethylene units.

As noted above, most of the functionalized polyolefins that are useful in practicing this invention are commercially available. For example, maleic anhydride functionalized polypropylene is available from the Exxon Chemical Company of Houston, Tex., under the tradename EXXELOR. Specific EXXELOR products,include EXXELOR PO 1015 and 1020. These modified polypropylenes can be purchased at a variety of molecular weights. It should be understood that many commercially available functionalized polypropylenes contain some amount of ethylene or ethylene units. Usually, this amount is less than about 5 weight percent. Functionalized polypropylene and propylene-ethylene copolymers are also available from Elf Atochem of Philadelphia, Pa., under the tradename PPC, CA1000, or OE707. OE707 is a propylene-ethylene copolymer that contain from about 20 to about 25 percent by weight polyethylene. Still further, functionalized polypropylene is available from Uniroyal Chemical Co., Inc. of Middlebury, Conn. under the tradename Polybond 3001, 3002, or 3150.

According to the present invention, functionalized polyolefin is added to a vulcanizable composition of matter that is useful for fabricating tires. Generally, the functionalized polyolefin is added in an amount up to about 35 parts by weight per one hundred parts by weight rubber (phr). Preferably, the functionalized polyolefin is added in an amount from about 5 to about 30 parts by weight phr, more preferably from about 10 to about 25 parts by weight phr, and even more preferably from about 15 to about 22 parts by weight phr.

Although functionalized polyolefins are added to vulcanizable compositions of matter that are useful for fabricating tires, practice of this invention does not alter the type or amount of other ingredients typically included within these vulcanizable compositions of matter. Accordingly, practice of this invention is not limited to any one particular vulcanizable composition of matter or tire compounding stock.

Typically, these vulcanizable compositions of matter include rubber component that is blended with reinforcing fillers and at least one vulcanizing agent. These compositions typically also include other compounding additives. These additives include, without limitation, accelerators, oils, waxes, scorch inhibiting agents, and processing aids. As known in the art, vulcanizable compositions of matter containing synthetic rubbers typically include antidegradants, processing oils, zinc oxide, optional tackifying resins, optional reinforcing resins, optional fatty acids, optional peptizers, and optional scorch inhibiting agents.

These vulcanizable compositions are compounded or blended by using mixing equipment and procedures conventually employed in the art. Preferably, an initial masterbatch is prepared that includes the rubber component and the reinforcing fillers, as well as other optional additives such as processing oil and antioxidants. According to this invention, it is preferred to add the functionalized polyolefin during preparation of the initial masterbatch. Once this initial masterbatch is prepared, the vulcanizing agents are blended into the composition. This vulcanizable composition of matter can then be processed according to ordinary tire manufacturing techniques. Likewise, the tires are ultimately fabricated using standard rubber curing techniques. For further explanation of rubber compounding and the additives conventionally employed, one can refer to *The Compounding and Vulcanization of Rubber*, by Stevens in *Rubber Technology Second Edition* (1973 Van Nostrand Reihold Company), which is incorporated herein by reference.

The elastomers that are typically employed within vulcanizable compositions of matter that are useful for making tires include both natural and synthetic elastomers rubbers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomer, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. As used herein, the term elastomer or rubber will refer to a blend of synthetic and natural rubber, a blend of various synthetic rubbers, or simply one type of elastomer or rubber. Also, the elastomers that are useful in practicing this invention include any of the various functionalized elastomers that are conventionally employed in the art of making tires. Inasmuch as the preferred embodiments of the present invention are directed toward off-road and heavy truck tires, it is preferred to employ natural rubber and SBR with natural rubber being most preferred.

The reinforcing agents, such as carbon black or silica, typically are employed in amounts ranging from about 1 to about 100 parts by weight per 100 parts by weight rubber (phr), with about 20 to about 80 parts by weight (phr) being preferred, and with about 40 to about 80 parts by weight (phr) being most preferred. The carbon blacks may include any of the commonly available, commercially-produced carbon blacks, but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

CARBON BLACKS

| ASTM Designation (D-1765-82a) | Surface Area ($m^2/g$) (D-3765) |
|---|---|
| N-110 | 126 |
| N-220 | 111 |

-continued

CARBON BLACKS

| ASTM Designation (D-1765-82a) | Surface Area ($m^2/g$) (D-3765) |
|---|---|
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

When employed, silica can be used in the amount of about 1 part to about 100 parts by weight per 100 parts of polymer (phr), preferably in an amount from about 5 to about 80 phr. The useful upper range is limited by the high viscosity imparted by fillers of this type. Usually, both carbon black and silica are employed in combination as the reinforcing filler. When both are used, they can be used in a carbon black:silica ratio of from about 10:1 to about 1:2. Some of the commercially available silicas that may be used include: Hi-Sil® 215, Hi-Sil® 233, and Hi-Sil® 190, produced by PPG Industries. Also, a number of useful commercial grades of different silicas are available from a number of sources including Rhone Poulenc. Typically, a coupling agent is added when silica is used as a reinforcing filler. One coupling agent that is conventionally used is bis-[3 (triethoxysilyl) propyl]-tetrasulfide, which is commercially available from Degussa, Inc. of New York, N.Y. under the tradename S169.

In addition to the advantageous feature of the present invention noted above, the cost of producing tires, especially off-road tires, can be significantly reduced by employing the formulations according to the present invention. Because functionalized polyolefins can be added to tire formulations or recipes without deleteriously impacting the ultimate properties of the tires, the use of functionalized polyolefins yields significant cost savings.

In order to demonstrate the practice of the present invention, the following examples have been prepared and tested as described in the Experimental Section disclosed hereinbelow. The examples should not, however, be viewed as limiting the scope of the invention. The claims will serve to define the invention.

GENERAL EXPERIMENTATION

Experiment I

Stocks 1–10

Ten tire stocks were prepared according to the recipe set forth in Table I. Each recipe was the same except for the absence or presence of polypropylene or functionalized polypropylene in varying amounts.

TABLE I

Tire Recipe

| Ingredients | Amount |
|---|---|
| Natural Rubber | 100 |
| Polyolefin | 0–30 |
| Carbon black | 50 |
| Hardened Fatty Acid | 1.5–2.5 |
| Antioxidant | 1.5–2.5 |
| Antioxidant | 0.2–0.4 |
| Sulfur | 1.1–1.4 |
| Accelerator | 1.0–1.5 |
| Zinc Oxide | 3.0–4.0 |
| Retardor | 0.05–0.15 |

Each stock was compounded within an internal mixer by using compounding techniques conventionally employed in the art. Specifically, the natural rubber, carbon black, antioxidants, zinc oxide, and optional polyolefin additives were masterbatched at about 50 r.p.m. within an internal mixer. The initial mixing temperature was about 132° C. and the drop temperature, which occurred in about 5 minutes, was about 180° C. The masterbatch was cooled and added back to the mixer set at an initial temperature of 70° C. The sulfur, hardened fatty acid, accelerator and retardor were then charged and mixing continued at 50 r.p.m. The mixture was then dropped at 110° C. Each stock was then sheeted and cured at about 145° C. for about 33 minutes. Table II includes the type of polyolefin employed in each stock. Molecular weight refers to the relative weight-average molecular weight as determined by GPC analysis calibrated by using polystyrene standards. In fact, all molecular weights disclosed within this specification refer to relative weight-average molecular weight with polystyrene standards. The resulting vulcanizates were tested for various physical properties as set forth in Table II.

TABLE II

Physical and Mechanical Properties at 100° C. Prior to Heat Aging

| Stock | 1 | 2 | 3 | 4 | 5 | 6 | 7 | 8 | 9 | 10 |
|---|---|---|---|---|---|---|---|---|---|---|
| Polyolefin (phr) | 0 | 10 | 20 | 30 | 10 | 20 | 30 | 10 | 20 | 30 |
| Functionalized | — | yes | yes | yes | no | no | no | no | no | no |
| Molecular weight | — | 175,000 | 175,000 | 175,000 | 250,000 | 250,000 | 250,000 | 120,000 | 120,000 | 120,000 |
| Ring Tear @ 100° C. | | | | | | | | | | |
| Tear Strength (lb/in) 100° C. | 451 | 467 | 590 | 675 | 557 | 666 | 557 | 498 | 436 | 352 |
| Travel at Tear (%) | 569 | 513 | 567 | 614 | 408 | 449 | 302 | 600 | 561 | 435 |
| Ring Tensile @ 100° C. | | | | | | | | | | |
| Tensile Strength (psi) 100° C. | 2922 | 3307 | 2625 | 2833 | 2313 | 2025 | 2186 | 2844 | 2102 | 1590 |
| Tensile Toughness (psi) 100° C. | 7721 | 9767 | 7631 | 8778 | 5329 | 4674 | 4335 | 7775 | 5720 | 3862 |
| Maximum Elongation (%), 100° C. | 669 | 706 | 635 | 642 | 449 | 418 | 338 | 668 | 622 | 506 |
| Tensile Modulus @ 50% Eb 100° C. | 116 | 166 | 202 | 268 | 302 | 306 | 446 | 144 | 156 | 194 |
| Tensile Modulus @ 300% Eb 100° C. | 830 | 998 | 1043 | 1239 | 1550 | 1547 | 2042 | 886 | 799 | 850 |
| Wear Lambourn Index 65% Slip | 100 | 95.8 | 95.0 | 90.8 | 87.6 | 94.0 | 89.8 | 90.8 | 74.2 | 57.0 |
| Tanδ at 80° C. | 0.150 | 0.156 | 0.158 | 0.158 | 0.163 | 0.170 | 0.167 | 0.149 | 0.169 | 0.167 |

Stocks 2–4 included maleic anhydride functionalized polypropylene, Stocks 5–7 included high molecular weight polypropylene, and Stocks 8–10 included low molecular weight polypropylene. The maleic anhydride functionalized polypropylene that was used was EXXELOR® PO1015, which was obtained from Exxon. This polypropylene contained about 3 weight percent ethylene but showed no polyethylene crystals. The polypropylene employed was obtained from Aldrich Chemical Company, Inc. of Milwaukee, Wis.

As can be seen from the foregoing data in Table II, the tear strengths of Stocks 2–4 increased proportionally to the amount of maleic anhydride functionalized polypropylene that was added. Indeed, the tear strength of Stock 2 is about 13 percent better than the control stock, the tear strength of Stock 3 is about 30 percent better than the control stock, and the tear strength of Stock 4 is about 50 percent better than the control stock. This is significant inasmuch as these improved properties did not deleteriously impact the mechanical properties, wear properties, and hysterisis at high temperatures. Because hysterisis is related to the heat build-up during tire service on the road, it is desirable to have lower hysterisis (tan δ) at higher temperatures. The stocks according to this invention only had a hysterisis increase of about 4%, but the comparative stocks showed an increase that was as high as 14%.

With respect to Stocks 5, 6, and 7, which included non-functionalized polypropylene having a molecular weight of about 250,000, an increase in tear strength that was proportional to the amount of polypropylene that was added was also observed. But, the tensile, mechanical, and wear properties were deteriorated. Likewise, the mechanical properties of the stocks with low molecular weight polypropylene, i.e., Stocks 8–10, were worse than that of the control stock.

The tensile and wear properties of each stock were also determined after heat aging at 100° C. for 24 hours. Table III includes this data.

This decrease in physical properties, however, was insubstantial compared to the decrease observed with those stocks that included non-functionalized polypropylene, i.e., Stocks 5–10.

Experiment II

Stocks 11–15

In a similar fashion to that described for in Experiment I, a second set of stocks were prepared and tested. Again, each stock was the same except for the absence or presence of polypropylene or functionalized propylene-ethylene copolymers. Table I sets forth the tire recipe used. Table IV sets forth the type and amount of polypropylene employed as well as the analytical results obtained before heat aging.

The maleic anhydride functionalized polypropylene that was used in Stocks 12 and 13 was purchased from Exxon under the tradename EXXELOR® PO1015 as used in Experiment I; and that used for Stocks 14 and 15 was

TABLE III

Physical and Mechanical Properties at 100° C. After Heat Aging

| Stock | 1 | 2 | 3 | 4 | 5 | 6 | 7 | 8 | 9 | 10 |
|---|---|---|---|---|---|---|---|---|---|---|
| Polyolefin (phr) | 0 | 10 | 20 | 30 | 10 | 20 | 30 | 10 | 20 | 30 |
| Functionalized | — | yes | yes | yes | no | no | no | no | no | no |
| Molecular weight | — | 135,000 | 135,000 | 135,000 | 250,000 | 250,000 | 250,000 | 120,000 | 120,000 | 120,000 |
| Ring Tensile @ 100° C. | | | | | | | | | | |
| Tensile Strength (psi) 100° C. | 2702 | 2705 | 2648 | 2192 | 2377 | 1708 | 1249 | 2135 | 1885 | 1603 |
| Tensile Toughness (psi) 100° C. | 6669 | 7206 | 7591 | 6158 | 5771 | 3960 | 2504 | 4251 | 3379 | 2098 |
| Maximum Elongation (%), 100° C. | 583 | 594 | 605 | 546 | 542 | 481 | 382 | 371 | 321 | 226 |
| Tensile Modulus @ 50% Eb 100° C. | 139 | 185 | 229 | 271 | 175 | 196 | 233 | 331 | 367 | 467 |
| Tensile Modulus @ 300% Eb 100° C. | 1072 | 1148 | 1191 | 1220 | 1120 | 990 | 967 | 1774 | 1798 | — |
| Wear Lambourn Index 65% slip | 100 | 103.4 | 112.4 | 110.6 | 98.1 | 110.9 | 108.7 | 95.3 | 83.0 | 76.6 |

The data in Table III evidences the usefulness of the present invention within off-road or heavy truck tires because the mechanical properties imparted upon these tires creates much heat. These tires, therefore, perform for long periods of time under high heat conditions that typically cause further heat aging of the tires. The ability of these tires to maintain their physical and mechanical properties after heat aging, therefore, is a significant property.

Based on the data in Table III, the addition of functionalized polypropylene proportionally caused some decrease in the physical and mechanical properties of Stocks 2–4.

purchased from Elf Atochem under the tradename OE707. The OE707 copolymers contained about 23% by weight ethylene and showed polyethylene crystals. Namely, DSC thermal analysis showed peaks at about 121° C., and by using x-ray diffraction analysis, peaks were observed at 2θ=21.64 (PE (110)), and 2θ=24.03 (PE (200)), based on orthorhombic PE crystal structure. These stocks were compounded as in Experiment I, sheeted, and then subsequently cured at about 145° C. for about 33 minutes. In addition to the testing that was done at 100° C., physical and mechanical properties were measured at 23° C.

TABLE IV

Physical and Mechanical Properties

| Stock | 11 | 12 | 13 | 14 | 15 |
|---|---|---|---|---|---|
| Polyolefin (phr) | 0 | 20 | 30 | 20 | 30 |
| Functionalized | — | yes | yes | yes | yes |
| Molecular weight | — | 175,500 | 175,500 | 358,000 | 358,000 |
| Ring Tear @ 23° C. | | | | | |
| Tear Strength (psi) | 726.4 | 658 | 680 | 876 | 728 |
| Travel at Tear (%) | 528 | 398 | 357 | 400 | 277 |
| Ring Tear @ 100° C. | | | | | |
| Tear Strength (psi) | 414 | 486 | 524 | 542 | 517 |
| Travel at Tear (%) | 540 | 600 | 622 | 524 | 452 |

TABLE IV-continued

Physical and Mechanical Properties

| Stock | 11 | 12 | 13 | 14 | 15 |
|---|---|---|---|---|---|
| Ring Tensile @ 23° C. | | | | | |
| Modulus at 50% Eb (psi) | 169 | 374 | 624 | 393 | 554 |
| Modulus at 300% Eb (psi) | 1777 | 2318 | 2836 | 2444 | 2870 |
| Tensile Strength (psi) | 3258 | 3243 | 3548 | 3228 | 3476 |
| Maximum Elongation (%) | 442 | 402 | 384 | 398 | 375 |
| Tensile Toughness (psi) | 5650 | 6170 | 7250 | 6348 | 6950 |
| Ring Tensile @ 100° C. | | | | | |
| Modulus at 50% Eb (psi) | 163 | 237 | 296 | 288 | 325 |
| Modulus at 300% Eb (psi) | 100 | 1079 | 1210 | 1204 | 1384 |
| Tensile Strength (psi) | 2719 | 2956 | 2930 | 2474 | 2167 |
| Maximum Elongation (%) | 596 | 686 | 664 | 615 | 526 |
| Tensile Toughness (psi) | 6864 | 9177 | 9373 | 7675 | 6230 |
| Dumbbell Tensile @ 23° C. | | | | | |
| Modulus at 50% Eb (psi) | 186 | 507 | 798 | 882 | 991 |
| Modulus at 300% Eb (psi) | 1282 | 2220 | 2706 | 3045 | 3180 |
| Tensile Strength (psi) | 4617 | 4750 | 4609 | 4852 | 4211 |
| Maximum Elongation (%) | 774 | 669 | 595 | 558 | 460 |
| Tensile Toughness (psi) | 15630 | 16480 | 15580 | 15460 | 11680 |
| Dumbbell Tensile 100° C. | | | | | |
| Modulus at 50% Eb (psi) | 194 | 341 | 443 | 517 | 638 |
| Modulus at 300% Eb (psi) | 881 | 1158 | 1311 | 1461 | 1660 |
| Tensile Strength (psi) | 3404 | 3095 | 3045 | 2880 | 2708 |
| Maximum Elongation (%) | 997 | 887 | 852 | 748 | 675 |
| Tensile Toughness (psi) | 15780 | 14210 | 14300 | 12410 | 11390 |
| Wear Lambourn Index 65% slip | 100 | 93.78 | 85.75 | 97.09 | 97.52 |
| Tanδ at 100° C. | 0.1353 | 0.1491 | 0.1534 | 0.16 | 0.1707 |
| Heat Index (Tanδ at 100° C./M50) | .00083 | .00063 | .00052 | .00056 | .00053 |

As with the previous Experiment, the addition of functionalized propylene-ethylene copolymers gave rise to increased tear strength at 100° C., as well as 23° C. This increased tear strength was achieved without substantial deterioration in the physical and mechanical properties of the vulcanizate. Although hysteresis increased with the addition of functionalized polyolefin, the increase was offset by an increase in modulus at 50 percent. Indeed, the Heat Index of Stocks 12–15 was less than that of the control of Stock 11. Heat index is the ratio of hysteresis loss at 100° C. to modulus at 50 percent. The heat index calculated in Table IV was tan δ at 100° C./modulus at 50 percent (ring tensile 100° C.). It should be understood that higher moduls corresponds to less deformation potential which offsets an increase in hysterisis.

The mechanical and wear properties of each of the Stocks 11–15 were also determined after heat aging at 100° C. for 24 hours. Table V includes the data obtained after aging.

TABLE V

Physical and Mechanical Properties After Heat Aging

| Stock | 11 | 12 | 13 | 14 | 15 |
|---|---|---|---|---|---|
| Polyolefin (phr) | 0 | 20 | 30 | 20 | 30 |
| Functionalized | — | no | no | yes | yes |
| Molecular weight | — | 135,500 | 135,500 | 358,000 | 358,000 |

TABLE V-continued

Physical and Mechanical Properties After Heat Aging

| Stock | 11 | 12 | 13 | 14 | 15 |
|---|---|---|---|---|---|
| Ring Tensile @ 23° C. (heat aged) | | | | | |
| Modulus at 50% Eb (psi) | 194 | 431 | 642 | 467 | 654 |
| Modulus at 300% Eb (psi) | 1973 | 2472 | 2863 | 2588 | 2962 |
| Tensile Strength (psi) | 3340 | 3496 | 3583 | 3300 | 3132 |
| Maximum Elongation (%) | 440 | 430 | 394 | 398 | 325 |
| Tensile Toughness (psi) | 6090 | 7563.4 | 7670 | 6869 | 5662 |
| Ring Tensile @ 100° C. (heat aged) | | | | | |
| Modulus at 50% Eb (psi) | 178 | 241 | 336 | 244 | 404 |
| Modulus at 300% Eb (psi) | 1214 | 1220 | 1409 | 1229 | 1763 |
| Tensile Strength (psi) | 2766 | 2441 | 2375 | 2099 | 2235 |
| Maximum Elongation (%) | 560 | 558 | 521 | 524 | 405 |
| Tensile Toughness (psi) | 6756 | 6503 | 6527 | 5662 | 5088 |

Table V confirms that the addition of functionalized propylene-ethylene copolymers does not cause substantial deterioration in the physical and mechanical properties of the rubber after heat aging.

Experiment III

Stocks 16–19

Four additional tire stocks were prepared by using styrene-butadiene copolymers as the base rubber. The recipe that was used is set forth in Table VI. Each recipe was the same except for the absence or presence of polypropylene or functionalized polyolefins in varying amounts.

polypropylene that was obtained from Aldrich Chemical Company. The stocks were compounded, sheeted, and then subsequently cured at about 145° C. for about 33 minutes as in Experiment I. Physical and mechanical properties were measured at 23° and 100° C. before and after heat aging. Tan δ at 0°, 50°, and 100° C. was also determined, as was the wear index for each stock. Table VII sets forth the type and amount of polyolefin employed as well as the analytical results obtained before heat aging.

TABLE VII

| | Physical and Mechanical Properties | | | |
|---|---|---|---|---|
| Stock | 16 | 17 | 18 | 19 |
| Polyolefin (phr) | 0 | 20 | 20 | 20 |
| Functionalized | — | yes | yes | no |
| Molecular Weight | — | 175,000 | 358,000 | 250,000 |
| Ring Tear @ 23° C. | | | | |
| Tear Strength (psi) | 432 | 465 | 480 | 476 |
| Travel at Tear (%) | 407 | 352 | 338 | 242 |
| Ring Tear @ 100° C. | | | | |
| Tear Strength (psi) | 220 | 269 | 261 | 229 |
| Travel at Tear (%) | 304 | 342 | 328 | 180 |
| Ring Tensile @ 23° C. | | | | |
| Modulus at 50% Eb (psi) | 168 | 254 | 300 | 481 |
| Modulus at 300% @ Eb (psi) | 1571 | 1668 | 1852 | 2377 |
| Tensile Strength (psi) | 3061 | 3057 | 3094 | 2853 |
| Maximum Elongation (%) | 472 | 496 | 467 | 369 |
| Tensile Toughness (psi) | 5800 | 7019 | 6846 | 5539 |
| Ring Tensile @ 100° C. | | | | |
| Modulus at 50% Eb (psi) | 123 | 158 | 146 | 274 |
| Modulus at 300% @ Eb (psi) | 1251 | 1068 | 1045 | — |
| Tensile Strength (psi) | 1445 | 1441 | 1425 | 1353 |
| Maximum Elongation (%) | 328 | 368 | 368 | 288 |
| Tensile Toughness (psi) | 1816 | 2240 | 2155 | 2020 |
| Wear Lambourn Index 65% slip | 100 | 117 | 113 | 103 |
| Tanδ @ 0° C. | 0.4902 | 0.3888 | 0.4270 | 0.4244 |
| Tanδ @ 50° C. | 0.1725 | 0.183 | 0.1751 | 0.1842 |
| Tanδ @ 100° C. | 0.1261 | 0.1206 | 0.1263 | 0.1370 |

TABLE VI

Tire Recipe

| Ingredients | Amount |
|---|---|
| SBR Rubber | 100 |
| Polyolefin | 0–30 |
| Carbon Black (HAF) | 50 |
| Hardened Fatty Acid | 2 |
| Processing Oil | 10 |
| Antioxidant | 1 |
| Wax | 1 |
| Accelerator | 1 |
| Accelerator | 0.5 |
| Sulfur | 1.3 |
| Zinc Oxide | 3 |

Stock 16 was used as a control and did not contain any polyolefins; Stock 17 included a maleic anhydride functionalized polypropylene that was obtained from Exxon under the tradename EXXELOR® PO1015. Stock 18 included another maleic anhydride functionalized propylene-ethylene copolymer that was obtained from Elf Autochem under the tradename OE 707. Stock 19 included a non-functionalized As with the previous experiments, the addition of polypropylene gave rise to increased tear strength at 23° C. and 100° C. Although the use of non-functionalized polypropylene achieved this goal, the functionalized polyolefin did not deteriorate the physical and mechanical properties of the cured vulcanizates as much as the non-functionalized polypropylene additive did. It should be understood that tan δ at 0° C. is usually a predictor of wet traction. The higher tan δ at 0° C. indicates better traction. Tan δ at 50° C. is an indicator of rolling resistance, with the lower tan δ value indicating reduced resistance . And tan δ at 100° C. is usually a predictor of heat build-up.

As noted above, each of the vulcanized stocks were subjected to heat aging at 100° C. for about 24 hours. Table VIII sets forth the data obtained after heat aging.

TABLE VIII

| | Physical and Mechanical Properties After Heat Aging | | | |
|---|---|---|---|---|
| Stock | 16 | 17 | 18 | 19 |
| Polyolefins (phr) | 0 | 20 | 20 | 20 |
| Functionalized | — | yes | yes | yes |
| MW | — | 175,000 | 358,000 | 250,000 |

TABLE VIII-continued

Physical and Mechanical Properties After Heat Aging

| Stock | 16 | 17 | 18 | 19 |
|---|---|---|---|---|
| Ring Tensile @ 23° C. | | | | |
| Modulus @ 50% Eb (psi) | 147 | 198 | 191 | 291 |
| Modulus @ 300% Eb (psi) | — | — | — | — |
| Tensile Strength (psi) | 1246 | 1300 | 1539 | 1414 |
| Maximum Elongation (%) | 263 | 295 | 333 | 267 |
| Tensile Toughness (psi) | 1324 | 1692 | 2215 | 1891 |
| Ring Tensile @ 100° C. | | | | |
| Modulus @ 50% Eb (psi) | 182 | 2889 | 329 | 525 |
| Modulus @ 300% Eb (psi) | 1948 | 2067 | 2248 | — |
| Tensile Strength (psi) | 2429 | 2890 | 3124 | 2592 |
| Maximum Elongation (%) | 350 | 412 | 405 | 292 |
| Tensile Toughness (psi) | 3477 | 5758 | 6049 | 3946 |
| Wear Lambourn Index 65% slip | 100 | 106 | 110 | 116 |

Table VIII confirms that the addition of functionalized polypropylene does not cause substantial deterioration in the physical and mechanical properties of the rubber after heat aging. Table VII likewise confirms that the addition of polypropylene to a tire recipe containing styrene-butadiene copolymers as the base rubber increases the wear properties of the vulcanizate even after heat aging.

Experiment IV

Stocks 20–23

Four tire stocks were prepared according to the recipe set forth in Table IX. Notably, this recipe includes styrene-butadiene copolymers as the base rubber and silica as an exclusive filler. Each recipe was the same except for the absence or presence of polypropylene or functionalized polyolefin.

TABLE IX

Tire Recipe

| Ingredient | Amount (parts by weight) |
|---|---|
| SBR Rubber | 96 |
| Natural Rubber | 20 |
| Polyolefin | 0–30 |
| Silica | 80 |
| Hardened Fatty Acid | 2 |
| Processing Oil | 20 |
| Silane | 8 |
| Wax | 1.7 |
| Antioxidant | 0.95 |
| Antioxidant | 1.5 |
| Accelerator | 0.5 |
| Accelerator | 1.5 |
| Sulfur | 1.7 |
| Zinc Oxide | 2.5 |
| Retardor | 0.25 |

The styrene-butadiene copolymer rubber was obtained from Firestone Synthetic Rubber Company under the tradename D753. The silica that was employed was obtained from PPG Industries, Inc. under the tradename Highsil 190. The silane employed was bis [3 (triethoxisilyl) propyl] tetrasulfide, and was obtained from Degussa AG, FRG under the tradename Reinforcing Agent SI69. The other ingredients are conventionally employed in the tire industry and are commercially available from a number of sources. The ingredients were consistently used in each stock except for the absence or presence of polypropylene or functionalized polyolefins.

Stock 20 did not include any polyolefin additive and therefore was used as a control; Stock 21 included a functionalized polypropylene that was obtained from Exxon under the tradename EXXELOR® P1015. Stock 22 included a functionalized propylene-ethylene copolymer that was obtained from Elf Autochem under the tradename OE707. Stock 23 included a non-functionalized polypropylene that was obtained from Aldrich Chemicals. Each stock was compounded within an internal mixer by using compounding techniques conventionally employed in the art. Specifically, the rubbers, silica, hardened fatty acid, processing oil, wax, antioxidants, zinc oxide, retardor, and optional polyolefin additives were mixed within an internal mixer at about 50 rpm. The initial temperature was set at about 110° C. and the composition was dropped at about 170° C. The mixture was then cooled and the silane was added. Mixing was continued at about 50 rpm for about 1 minute until dropped at about 155° C. The mixture was again cooled, and the sulfur and accelerators were added and mixing was continued for about 30 seconds until dropped at about 110° C. Each stock was then sheeted and cured at about 145° C. for about 33 minutes. The resulting vulcanizates were tested for various physical properties as set forth in Table X.

TABLE X

Physical and Mechanical Properties Before Heat Aging

| Stock | 20 | 21 | 22 | 23 |
|---|---|---|---|---|
| Polyolefins (phr) | 20 | 20 | 20 | 20 |
| Functionalized | — | yes | yes | no |
| Molecular Weight | — | 175,000 | 358,000 | 250,000 |
| Ring Tear @ 23° C. | | | | |
| Tear Strength (psi) | 343 | 354 | 350 | 391 |
| Travel at Tear (%) | 440 | 368 | 351 | 332 |

TABLE X-continued

Physical and Mechanical Properties Before Heat Aging

| Stock | 20 | 21 | 22 | 23 |
|---|---|---|---|---|
| Ring Tear @ 100° C. | | | | |
| Tear Strength (psi) | 398 | 457 | 432 | 353 |
| Travel at Tear (%) | 536 | 618 | 594 | 462 |
| Ring Tensile @ 100° C. | | | | |
| Modulus at 50% Eb (psi) | 154 | 199 | 196 | 223 |
| Modulus at 300% @ Eb (psi) | 1007 | 934 | 967 | 1012 |
| Tensile Strength (psi) | 1766 | 1887 | 1981 | 1586 |
| Maximum Elongation (%) | 444 | 514 | 508 | 419 |
| Tensile Toughness (psi) | 3330 | 4370 | 4459 | 3158 |
| Ring Tensile @ 23° C. | | | | |
| Modulus at 50% Eb (psi) | 205 | 284 | 303 | 343 |
| Modulus at 300% @ Eb (psi) | 1273 | 1346 | 1504 | 1693 |
| Tensile Strength (psi) | 3328 | 2966 | 3120 | 3216 |
| Maximum Elongation (%) | 568 | 560 | 535 | 518 |
| Tensile Toughness (psi) | 7774 | 7593 | 7633 | 7903 |
| Tanδ @ 0° C. | 0.2574 | 0.2694 | 0.2598 | 0.2786 |
| Tanδ @ 50° C. | 0.1508 | 0.1432 | 0.1499 | 0.1547 |
| Tanδ @ 100° C. | 0.1022 | 0.1028 | 0.1122 | 0.1069 |

The data set forth in Table X demonstrates that polypropylene is capable of improving the tear strength of styrene-butadiene copolymer vulcanizates exclusively filled with silica. Notably, however, the use of functionalized polyolefins yields improved tear strength at higher temperatures than non-functionalized polypropylene.

As with the foregoing experiments, each of the vulcanized stocks were subjected to heat aging at about 100° C. for about 24 hours. Table XI sets forth the data obtained after heat aging.

TABLE XI

Physical and Mechanical Properties After Heat Aging

| Stock | 20 | 21 | 22 | 23 |
|---|---|---|---|---|
| Polyolefin (phr) | 0 | 20 | 20 | 20 |
| Functionalized | — | yes | yes | no |
| Molecular Weight | — | 135,000 | 206,000 | 250,000 |
| Ring Tensile @ 100° C. | | | | |
| Modulus @ 50% Eb (psi) | 233 | 289 | 246 | 299 |
| Modulus @ 300% Eb (psi) | 868 | 1312 | 1198 | 1300 |
| Tensile Strength (psi) | 1502 | 1728 | 1540 | 1378 |
| Maximum Elongation (%) | 307 | 378 | 365 | 304 |
| Tensile Toughness (psi) | 2098 | 3125 | 2650 | 2390 |
| Ring Tensile @ 23° C. | | | | |
| Modulus @ 50% Eb (psi) | 287 | 406 | 397 | 442 |
| Modulus @ 300% Eb (psi) | 1912 | 1945 | 1960 | — |
| Tensile Strength (psi) | 3343 | 2749 | 3064 | 2499 |
| Maximum Elongation (%) | 452 | 409 | 441 | 452 |
| Tensile Toughness (psi) | 6513 | 5514 | 6584 | 4645 |

Based on the data in Table XI, it should be evident that the use of functionalized polyolefins improved the tear strength of styrene-butadiene vulcanizates filled with silica without seriously degrading the properties of the vulcanizate after heat aging. Indeed, the use of the functionalized-polyolefin out performed the use of non-functionalized polypropylene.

Experiment V

The same tire recipe employed in Experiment I was employed to prepare six additional stocks with the exception that synthetically produced high cis-polyisoprene was substituted for the natural rubber employed in Experiment I. This polyisoprene was obtained from the Goodyear Tire & Rubber Company under the tradename NATSYN 2200. As with the previous experiments, each stock was the same except for the absence or presence of polypropylene or functionalized polyolefins. Table XII sets for the type and amount of polypropylene employed as well as the analytical results obtained before heat aging.

TABLE XII

Physical and Mechanical Properties Before Heat Aging

| Stock | 24 | 25 | 26 | 27 | 28 | 29 |
|---|---|---|---|---|---|---|
| Polyolefin (phr) | 0 | 20 | 20 | 0 | 20 | 20 |
| functionalized | — | yes | no | — | yes | no |
| Molecular Weight | — | 175,000 | 250,000 | — | 358,000 | 250,000 |

TABLE XII-continued

Physical and Mechanical Properties Before Heat Aging

| Stock | 24 | 25 | 26 | 27 | 28 | 29 |
|---|---|---|---|---|---|---|
| Ring Tear @ 23° C. | | | | | | |
| Tear Strength (psi) | 907 | 1114 | 1032 | 1155 | 1106 | 1004 |
| Travel at Tear (%) | 635 | 630 | 418 | 733 | 536 | 383 |
| Ring Tear @ 100° C. | | | | | | |
| Tear Strength (psi) | 426 | 565 | 596 | 482 | 644 | 539 |
| Travel at Tear (%) | 541 | 644 | 485 | 588 | 580 | 419 |
| Ring Tensile @ 23° C. | | | | | | |
| Modulus at 50% Eb (psi) | 168 | 254 | 300 | 164 | 470 | 502 |
| Modulus at 300% @ Eb (psi) | 1571 | 1668 | 1852 | 1508 | 2360 | — |
| Tensile Strength (psi) | 3061 | 3057 | 3094 | 3047 | 3204 | 2646 |
| Maximum Elongation (%) | 472 | 496 | 467 | 473 | 410 | 278 |
| Tensile Toughness (psi) | 5880 | 7019 | 6846 | 5773 | 6753 | 4026 |
| Ring Tensile @ 100° C. | | | | | | |
| Modulus at 50% Eb (psi) | 147 | 205 | 297 | 143 | 244 | 290 |
| Modulus at 300% @ Eb (psi) | 949 | 1005 | 1470 | 929 | 1200 | 1491 |
| Tensile Strength (psi) | 3076 | 3208 | 2732 | 3205 | 2712 | 1989 |
| Maximum Elongation (%) | 662 | 734 | 556 | 689 | 637 | 412 |
| Tensile Toughness (psi) | 8193 | 10235 | 7669 | 8886 | 8300 | 4461 |
| Tan δ @ 50° C. | 0.1522 | 0.1377 | 0.1563 | 0.114 | 0.139 | 0.1317 |
| Wear Lambourn Index 65% slip | 100 | 96 | 98 | 100 | 99 | 93 |

The data in Table XII is very similar to the data in Table II where natural rubber was employed. That is, the use of functionalized and non-functionalized polyolefins improve the tear strength of the synthetically prepared high cis-polyisoprene.

As with those vulcanizates prepared in Experiment I, the vulcanizates is this experiment were subjected to heat aging at about 100° C. for about 24 hours. Table XIII sets forth the data obtained after heat aging.

TABLE XIII

Physical and Mechanical Properties After Heat Aging

| Stock | 24 | 25 | 26 | 27 | 28 | 29 |
|---|---|---|---|---|---|---|
| Polyolefin (phr) | 0 | 20 | 20 | 0 | 20 | 20 |
| Functionalized | — | yes | no | — | yes | no |
| MW | — | 175,000 | 250,000 | — | 358,000 | 250,000 |
| Ring Tensile @ 23° C. | | | | | | |
| Modulus @ 50% Eb (psi) | 189 | 367 | 491 | 178 | 474 | 516 |
| Modulus @ 300% Eb (psi) | 1893 | 2123 | — | 1767 | 2477 | — |
| Tensile Strength (psi) | 4050 | 3254 | 3157 | 3724 | 3388 | 2743 |
| Maximum Elongation (%) | 506 | 443 | 316 | 500 | 422 | 266 |
| Tensile Toughness (psi) | 8404 | 7290 | 5221 | 7641 | 7445 | 3805 |
| Ring Tensile @ 100° C. | | | | | | |
| Modulus @ 50% Eb (psi) | 142 | 206 | 293 | 155 | 272 | 325 |
| Modulus @ 300% Eb (psi) | 1010 | 1023 | 1483 | 1094 | 1317 | 1575 |
| Tensile Strength (psi) | 2545 | 2504 | 1993 | 2605 | 2278 | 1860 |
| Maximum Elongation (%) | 594 | 641 | 420 | 577 | 535 | 370 |
| Tensile Toughness (psi) | 6464 | 7417 | 4571 | 6520 | 6319 | 3827 |
| Wear Lambourn Index 65% slip | 100 | 92 | 101 | 100 | 124 | 117 |

The data in Table XIII is likewise consistent with that data obtained in Experiment I where natural rubber was employed. That is, the use of functionalized polyolefins out performed the use of non-functionalized polypropylene especially with regard to the physical properties maintained after heat aging.

ANALYTICAL PROCEDURES

The tensile mechanical properties were measured using the standard procedure described in ASTM-D 412 at 23 and 100° C. The round rings employed had dimensions of 0.05 inches in width and 0.075 inches in thickness. A specific gauge length of 1.0 inch was used for the tensile test.

The tear strengths of the vulcanized stocks were measured using ASTM-D 624 procedure at 23 and 100° C. The test specimens were round rings nicked on the inside circumference at two points. The rings had a dimension of 0.25 inches in width, 0.10 inches in thickness, and having 44 mm inner diameter and 57.5 mm outer diameter. Each specimen was tested at the specific gauge length of 1.750 inches.

The tan δ data was obtained using a Rheometrics Dynamic Analyzer and the dynamic temperature step test procedure. Test specimens used for dynamic temperature sweep test were rectangular slabs with a dimensions of 0.5, 1.5, 0.1 inches in width, length, and thickness, respectively. The following test conditions were employed: Frequency 31.4 rad/sec, strain of 0.2% for temperature range from −70° C. to −10° C., while 2% strain was used for temperature sweep from −10° C. to 100° C.

The wear resistance of each test sample was evaluated by weighing the amount of wear using the Lambourn test. The wearing index was obtained from the ratio of the weight loss of the control to that of the tested sample. Samples with higher wear indices have better wear resistance properties. Samples used for the Lambourn test were circular donuts having a 0.9 inch inner diameter, 1.9 inch outer diameter, and 0.195 inch thickness. Test specimens were placed on an axle and run at a slip ratio of 65% against a driven abrasive surface. Formulation 1 was used as a control.

X-ray diffraction measurements were used to probe and characterize the crystal structures of the polymers. The measurements were carried out under reflection mode at room temperature by using the Rigaku diffractometer. The configurations for the X-ray measurement set up are: radiation source: Cu-Kα with Ni filter; voltage: 30 kv; current: 20 mA; divergence slit: 1°; receiving slit: 0.3 mm; scattering slit: 1°; scattering range 2θ: 10°–30°; scanning step width: 0.05°.

The samples were heat molded at 200° C. under a pressure of 5000 psi for 20 minutes and then were slowly cooled to room temperature. Discs were formed with a dimension of 2 mm in thickness and 1 inch in diameter. This sample disc was then cut to fit the sample holder for the measurement. The polypropylene was identified with monoclicic α crystalline phase with unit cell parameters of a=6.665 Å, b=20.96 Å, and α=γ=90°, and β=99.39°. The polyethylene is characterized with orthorhombic crystalline phase with unit cell parameters of a =7.406 Å, b=4.935 Å, c=2.547 Å, and α=β=γ=90°.

The thermal analysis was conducted on a TA Instruments DSC 2910 Differential Scanning Calorimeter. Samples of about 10 mg were heated at a rate of 10° C./minute under a flow of nitrogen gas. The melting characteristics, such as melting temperatures and heat of fusion, were recorded.

NMR analysis was used to determine the ethylene and propylene composition in copolymers. The $^{13}$C NMR measurements were carried out at 130° C. by using a Varian Gemini 300 NMR Spectrometer. The polymer samples were dissolved in deuterated o-dichloro-benzene. The peak assignment was referred from the literature.

By titrating the acid groups, the maleic anhydride contents in the raw functionalized polyolefins were determine. About 1 g of the polymer was dissolved in 100 ml of toluene at reflux temperature. 200 μl of water was added during the reflux. Then the acid groups were titrated with alkali solution to give the maleic anhydride contents. 1% phenolpphthalein in methanol was employed as the indicator, and 0.0325N potassium hydroxide in methanolic/benzoyl alcohol 1/9 (vol/vol) was used as the alkali solution.

The GPC method was employed to determine the relative molecular weight and its distribution. Trichlorobenzene was used as the solvent to dissolve the polyolefins. The GPC measurements were conducted at 135° C. Polystyrene standards were used as the calibration and the sample molecular weights were determined according to this calibration procedure.

Thus it should be evident that the us of functionalized polyolefins is highly effective in increasing the tear strength of tire stocks. The invention is particularly suited for off road tires and heavy truck tires, but is not necessarily limited thereto. Moreover, the invention is particularly suited for use in base stock components of tires, but may be used in the manufacture of other tire components.

Based upon the foregoing disclosure, it should now be apparent that the use of the functionalized polyolefins within tire recipes or formulations will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A tire component comprising:

a vulcanized rubber; and from greater than 0 up to about 35 parts by weight per 100 parts by weight rubber of a functionalized polyolefin that includes at least one functionality that derives from maleic anhydride, acrylic acid, or epoxides.

2. The tire component of claim 1, where the functionalized polyolefin is maleic anhydride functionalized polypropylene.

3. The tire component of claim 1, where the tire component is a tire read.

4. The tire component of claim 3, where the tire component further comprises a silica filler.

5. The tire component of claim 1, where the functionalized polyolefin is present in an amount from about 15 to about 25 parts by weight per 100 parts by weight rubber.

6. The tire component of claim 1, where the functionalized polyolefin is present in an amount from about 5 to about 35 parts by weight per 100 parts by weight rubber.

7. The tire component of claim 6, where the functionalized polyolefin contains from about 0.05 to about 0.15 percent by weight of said at least one functionality.

8. The tire component of claim 1, where the functionalized polyoefin is present in an amount from about 10 to about 35 parts by weight per 100 parts by weight rubber.

9. The tire component of claim 8, where the functionalized polyolefin contains from about 0.05 to about 0.5 percent by weight of said at least one functionality.

10. The tire component of claim 8, where the functionalized polyolefin contains from about 0.05 to about 2 percent by weight of said at least one functionality.

11. The tire component of claim 1, where the functionalized polyolefin is present in an amount from about 5 to about 30 parts by weight rubber.

12. The tire component of claim 1, where the functionalized polyolefin is maleic anhydride modified propylene-ethylene copolymer.

13. The tire component of claim 12, where the functionalized polyolefin contains form about 1.5 to about 25 percent by weight of said at least one functionality.

14. The tire component of claim 4, where the tire component further comprises a silica coupling agent.

* * * * *